(12) United States Patent
Höhn

(10) Patent No.: US 6,388,410 B1
(45) Date of Patent: May 14, 2002

(54) APPARATUS AND METHOD FOR MONITORING A CLOSED-OFF INTERIOR SPACE OF A MOTOR VEHICLE

(75) Inventor: Ralf Höhn, Velbert (DE)

(73) Assignee: Witte-Velbert GmbH & Co. KG, Velbert (DE)

( * ) Notice: Subject to any disclaimer, the term of this patent is extended or adjusted under 35 U.S.C. 154(b) by 0 days.

(21) Appl. No.: 09/483,849

(22) Filed: Jan. 17, 2000

(30) Foreign Application Priority Data

Oct. 6, 1999 (DE) .......................................... 199 47 904

(51) Int. Cl.$^7$ ................................................ G05B 5/00
(52) U.S. Cl. ...................... 318/445; 318/449; 318/450; 318/456; 318/460; 318/466; 318/471; 318/483
(58) Field of Search .................................. 318/445, 449, 318/450, 456, 460, 466, 471, 483; 180/271, 272

(56) References Cited

U.S. PATENT DOCUMENTS 5,333,703 A * 8/1994 James et al. ................ 180/271
5,426,415 A * 6/1995 Prachar et al. ............... 180/272

\* cited by examiner

Primary Examiner—Karen Masih
(74) Attorney, Agent, or Firm—Martin A. Farber

(57) ABSTRACT

An apparatus invention relates to an apparatus and method for monitoring an interior space which is closed off by a locked and/or manually non-unlockable door, flap, sliding sunroof or the like, for example a passenger compartment or luggage compartment of a motor vehicle, with respect to living entities enclosed therein and the quality of their living environment, having a control circuit and sensor evaluation arrangements connected thereto, which arrangements each interact with at least one sensor, a first sensor evaluation arrangement outputting a first signal to the control circuit if there are living entities in the interior space, and a second sensor evaluation arrangement outputting a second signal to the control circuit if the living environment changes in the direction of life- and/or health-threatening states, at least one actuator connected to the control circuit acting on a motor-actuatable closure of the door, flap, sliding sunroof or the like, which is activated by the control circuit for the purpose of opening, unlocking or rendering unlockable the door, flap or the like when both the first and the second signals have been output.

30 Claims, 3 Drawing Sheets

APPARATUS AND METHOD FOR MONITORING A CLOSED-OFF INTERIOR SPACE OF A MOTOR VEHICLE

FIELD AND BACKGROUND OF THE INVENTION

In motor vehicles corresponding to the prior art, the doors, flaps or the like can be changed over by a key or with remote actuation from an open position, in which the doors, flaps or the like can be opened manually from the outside or inside, to a central locking position. In this position, opening is possible only from the interior space., The closures seated in the doors or flaps can also be moved to a third operating position. In this safety position, the door cannot be opened either from the outside or from the inside without a key or without remote control. In the last-mentioned safety position and also in the aforementioned central locking position, living entities, in particular human beings, sitting in the automobile cannot be freed from the outside in the event of a change in the quality of their living environment to a life- or health-threatening state. This leads to babies, toddlers and disabled people and also animals being put at risk, sometimes fatally, since they cannot be freed from the interior space either by their own efforts or by the efforts of others in the event, for example, of overheating or a reduction in the oxygen of the atmosphere.

SUMMARY OF THE INVENTION

The invention is based on the problem, therefore, of increasing the safety of living entities situated in the interior space whilst maintaining the anti-theft protection attained with the abovementioned closures.

According to the invention there is provided an apparatus for monitoring an interior space which is closed off by a locked and/or manually non-unlockable door, flap, sliding sunroof or the like, for example a passenger compartment or luggage compartment of a motor vehicle, with respect to living entities enclosed therein and the quality of their living environment, having a control circuit and sensor evaluation arrangements connected thereto, which arrangements each interact with at least one sensor, a first sensor evaluation arrangement outputting a first signal to the control circuit if there are living entities in the interior space, and a second sensor evaluation arrangement outputting a second signal to the control circuit if the living environment changes in the direction of life- and/or health-threatening states, at least one actuator connected to the control circuit acting on a motor-actuatable closure of the door, flap, sliding sunroof or the like, which is activated by the control circuit for the purpose of opening, unlocking or rendering unlockable the door, flap or the like when both the first and the second signal have been output.

According to the invention the is also provided a method for monitoring an interior space which is closed off by a locked and/or manually non-unlockable door, flap, sliding sunroof or the like, for example a passenger compartment or luggage compartment of a motor vehicle, with respect to living entities enclosed therein and the quality of their living environment, a first sensor evaluation arrangement interacting with at least one sensor outputting a first signal to a control circuit if there are living entities in the interior space, and a second sensor evaluation arrangement interacting with at least one sensor outputting a second signal to the control circuit if the living conditions change in the direction of life- and/or health-threatening circumstances, at least one actuator which is connected to the control circuit and acts on a motor-actuatable closure of the door, flap, sliding sunroof or the like being activated by the control circuit for the purpose of opening, unlocking or rendering unlockable the door, flap or the like when both the first and the second signal have been output. In an advantageous development of the invention, it is provided that the living entity recognition sensor evaluation arrangement comprises a plurality of sensors. Furthermore, the living entity recognition sensor evaluation arrangement may comprise different types of sensors. In particular, gas sensors which measure the partial pressure of the carbon dioxide or of the oxygen in the atmosphere of the interior space are provided here. Furthermore, sound, infrared or vibration sensors may be provided. The sensor evaluation arrangement may preferably assign the signals received from the at least one individual sensor to a signal-time spectrum. This is done by the sensor signal being stored at time intervals of a few milliseconds, for example, and this spectrum then being further processed by the living entity recognition sensor evaluation arrangement. The further processing may be effected by relating this signal-time spectrum to comparison spectra. In this case, by way of example, a difference value is formed by the spectra being compared with one another. This difference value is a criterion for the similarity of the spectra. There are, however, also other comparison or relating methods possible for obtaining a value for the similarity of the two spectra. If the similarity value exceeds a similarity threshold value, then the signal is output. In particular, it is provided here that, by way of example, the time characteristic over a number of minutes of the gas concentrations is determined and compared with stored spectra. In order to avoid erroneous triggerings and to make the entire sensor system more reliable, it is provided in particular that a plurality of signal-time spectra recorded simultaneously by different types of individual sensors are related to one another. In particular, it is provided that movements in the interior space are determined by means, for example, of an infrasonic or infrared or vibration sensor. The sensor signals are stored at predetermined time intervals. In parallel with and at the same time as this, it is possible, by way of example, to measure the carbon dioxide or oxygen gas pressure in the passenger compartment or in the luggage compartment. From the correlation of the two signal-time spectra, the living entity recognition sensor evaluation arrangement can then determine whether this relation is typical of the behaviour of a living entity. In addition, it is also possible to evaluate signal-time spectra from sound sensors. In this case, too, the evaluation is preferably effected by relating comparison signal-time spectra.

It is furthermore provided that the living condition monitoring sensor evaluation arrangement comprises a plurality of sensors. These sensors may even be the same sensors that are interrogated by the living entity recognition sensor evaluation arrangement. They may, in particular, be different types of sensors, in particular carbon dioxide or oxygen concentration sensors, sound and/or temperature sensors. In this case, too, it is again provided that the sensor evaluation arrangement relates a plurality of signals output by the individual sensors to one another and outputs the second signal when this relationship exceeds or falls below a limit value. This relationship may also be a purely logical relationship. In other words, the second signal is output when at least two of these sensors output a signal that exceeds a limit value. The activation after the two signals have been output may on the one hand relate to the closures of the doors or flaps. However, it is also provided that a window control mechanism is activated in such a way that the window is lowered. Furthermore, it may be provided that in the event of activation, the hazard warning lights and/or the horn are/is activated. In the case of the monitoring of a luggage compartment, in particular, it may be provided that the flap is opened only to a slightly open position. However it may also be provided that the luggage compartment lid is opened fully by the activation of a corresponding motor. In a development of the invention, an anti-theft alarm system is provided. This anti-theft alarm system is activated from the outside when a break-in takes place for example by a window being shattered from the outside. The activation of the anti-theft alarm system gives the control circuit a signal which prevents the activation of the actuators in the event of triggering. Furthermore, it is provided that the door or flap, in the event of activation, is only brought to an internally unlockable operating state, so that opening is possible from the inside. Opening from the outside, however, is still prevented. In this operating state, it may be provided that the capability of opening from the outside can nevertheless be established by the actuation of a switch in the interior.

BRIEF DESCRIPTION OF THE DRAWINGS

An exemplary embodiment of the invention is explained below with reference to accompanying drawings, in which.

DETAILED DESCRIPTION OF THE EMBODIMENT

Figure 1:
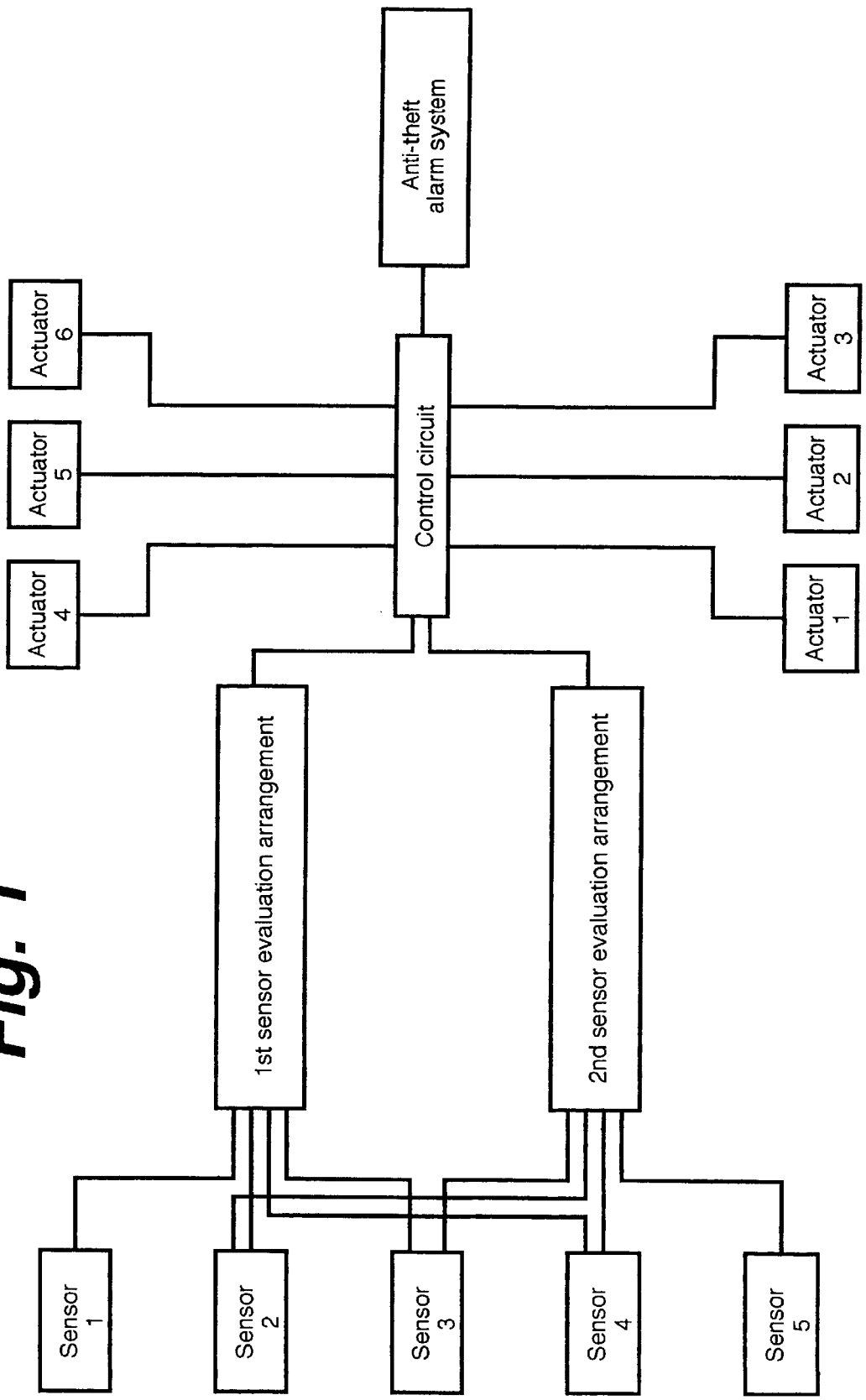
FIG. 1 shows a circuit of the apparatus in a schematic illustration, FIG. 2 schematically shows the sequence of the method in the case of the monitoring of the passenger compartment, and FIG. 3 schematically shows the sequence of the method in the case of the monitoring of the luggage compartment.
Figure 2:
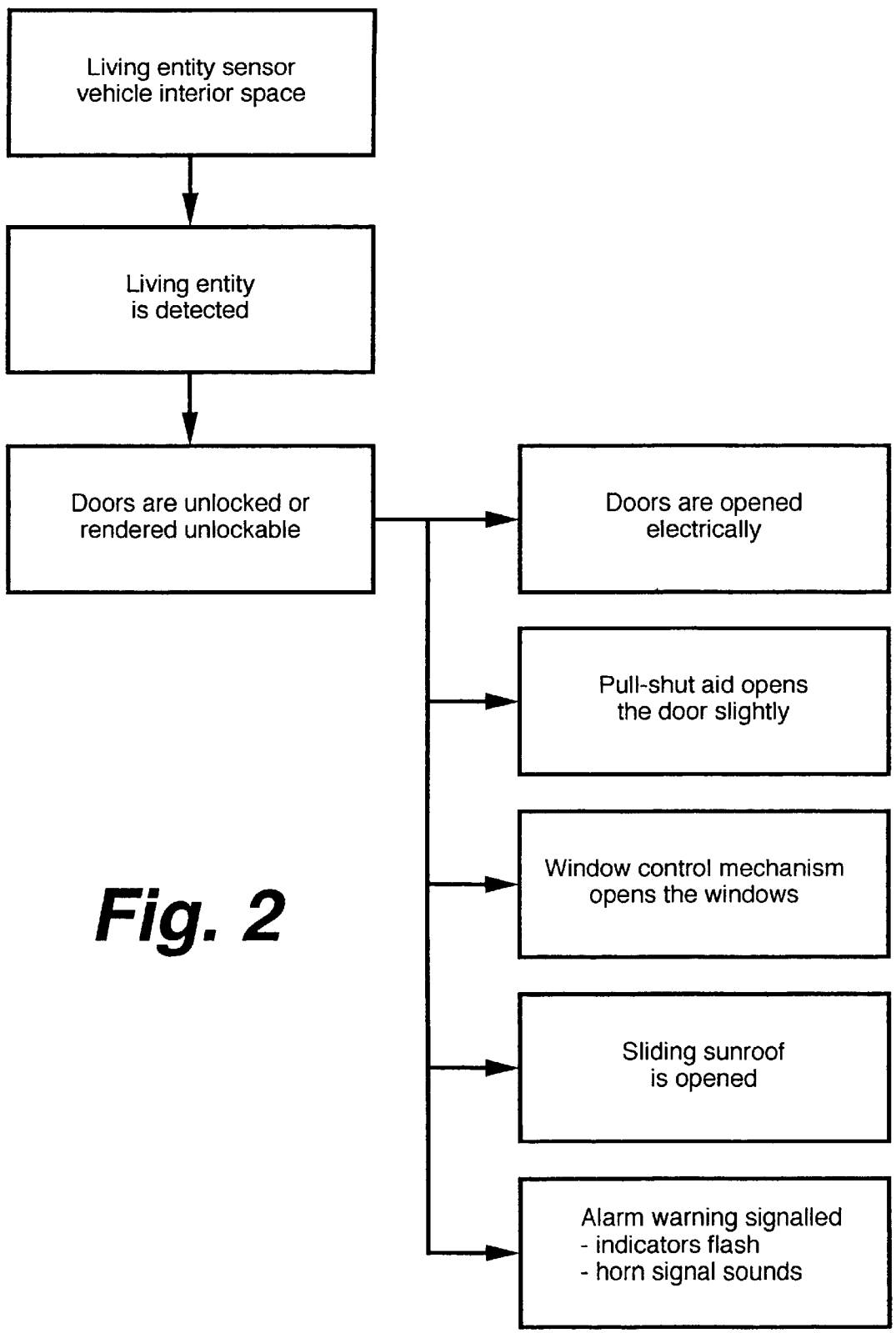
Figure 3:
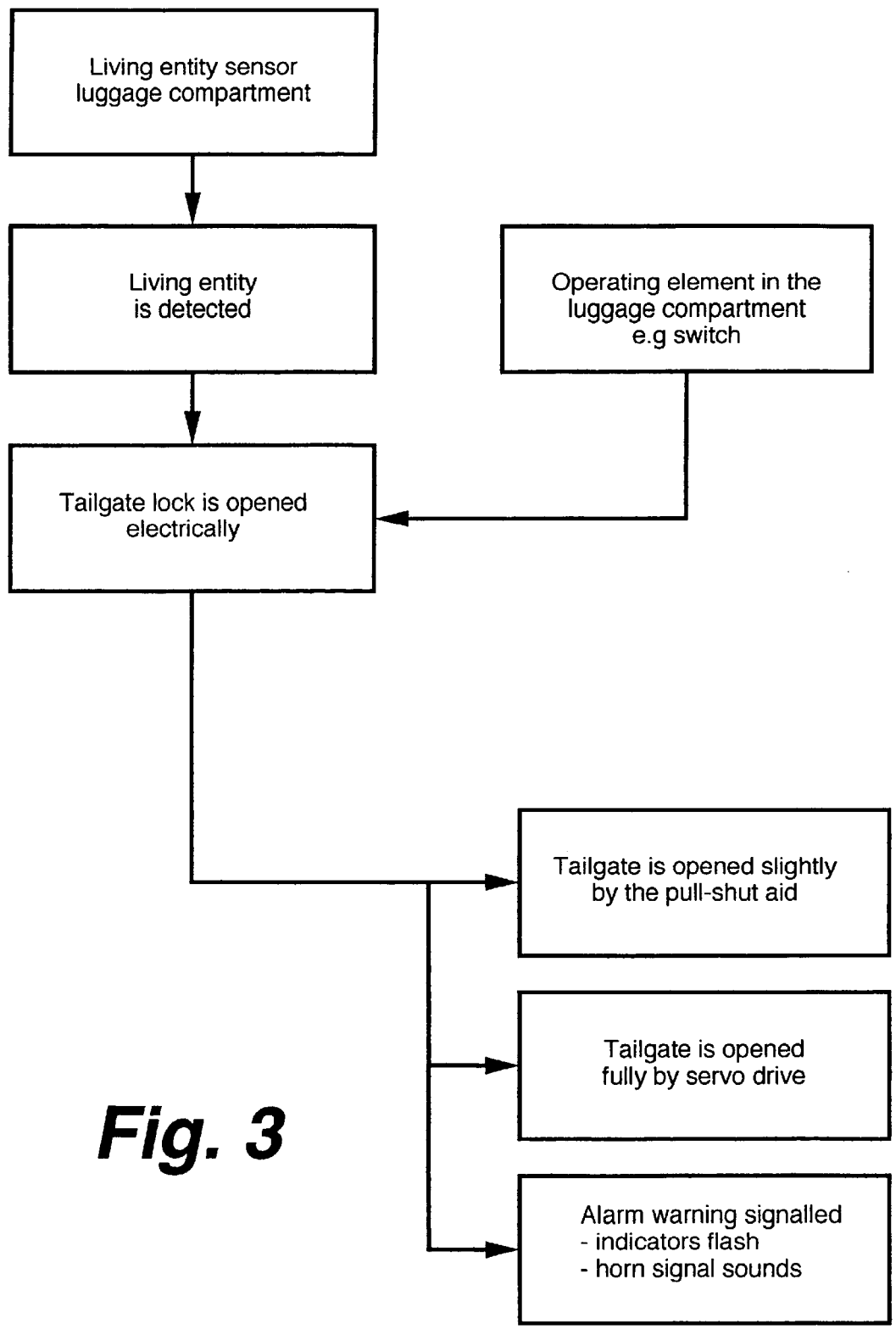

The schematic illustration of the apparatus as indicated in FIG. 1 comprises five sensors. These sensors form gas pressure sensors which measure the carbon dioxide partial pressure and/or the oxygen partial pressure in the atmosphere of the interior space. Furthermore, a sound sensor, an infrared sensor and/or a vibration sensor are/is provided as sensor. In addition, it is possible to provide a temperature sensor which, in an advantageous manner, is connected only to the second sensor evaluation arrangement. The plurality of sensors 2–4 are connected to the two sensor evaluation arrangements. There are a total of two sensor evaluation arrangements provided. The first sensor evaluation arrangement serves for monitoring the interior space of the motor vehicle with respect to living entities situated therein. This monitoring is effected by temporally correlating the signals recorded by the sensors 1–4 with comparison signals stored beforehand in the first sensor evaluation arrangement. These are, in particular, signal-time spectra. A similarity value is then determined using suitable methods, for example subtraction. This similarity value is compared with a threshold value. If the similarity value exceeds or falls below the threshold value, then a signal is output by the first sensor evaluation arrangement to a control circuit.

The sensors 2–5 are monitored by the second sensor evaluation arrangement in the same way. The signals output by the sensors 2–5 are stored by the second sensor evaluation arrangement and likewise correlated. A comparison with stored signal-time spectra is effected therein. The living environment, that is to say the physical parameters of the atmosphere of the interior space, is monitored by the second sensor evaluation arrangement. The monitoring is targeted in particular at the progression of the carbon dioxide concentration sand/or of the oxygen concentration. If the former increases or the latter decreases below a critical value, then the second signal can be output. A temperature sensor may additionally be monitored. If the latter exceeds a critical value and, from the evaluation of other sensors, for example of sound or movement sensors, there are grounds for assuming that there are living entities in the interior space, then the-second signal is likewise output.

The control circuit activates one or all of the actuators 1–6 when both signals are present simultaneously.

The actuators 1–6 act, in particular, on the closures of the doors or flaps on the motor vehicle and transfer them from one operating state to another in the event of the corresponding application of a signal by the control circuit. In particular, it is provided that the control circuit outputs activation signals to the actuators 1–6 only when the closures are in a so-called safety position, in which the closures can be manually actuated neither from the inside nor from the outside. In that case, the actuators 1–6 put these closures into an operating state such that the closures can be opened at least by the actuation of an internal handle. However, it is also provided that the closures are put into an operating state in which they can be opened both from the inside and from the outside. In addition, it is provided that the actuators activate a pull-shut aid disposed in the lock in such a way that they open the door or flap slightly. Furthermore, it may be provided that a window control mechanism is activated, which opens the window. The opening of a sliding sunroof is also provided, in order to supply the interior space with fresh air for the purpose of cooling.

In a supplementary manner, hazard warning lights or a horn may be activated.

If the monitored interior space is a luggage compartment, then an internal actuation handle, for example a switch, disposed in the luggage compartment may be activated, with the result that its actuation enables the luggage compartment lid to be opened. However, it is also provided that the tailgate is brought to a slightly open position by one of the actuators or is fully opened by the activation of a corresponding servo drive.

I claim:

1. Apparatus for monitoring an interior space of a motor vehicle which is closed off, with respect to living entities enclosed therein and environmental conditions within the interior space, said apparatus comprising a control circuit and sensor evaluation arrangements connected thereto, which arrangements each interact with at least one sensor, a first sensor evaluation arrangement outputting a first signal to the control circuit if there are living entities in the interior space, and a second sensor evaluation arrangement outputting a second signal to the control circuit upon detection of a predetermined change of environmental conditions within the interior space, at least one actuator connected to the control circuit acting on a motor-actuable closure of the interior space, which is activated by the control circuit for the purpose of opening, unlocking or rendering unlockable the interior space when both the first and the second signals have been output.

2. Apparatus according to claim 1, wherein the living entity recognition first sensor evaluation arrangement comprises a plurality of sensors.

3. Apparatus according to claim 1, wherein the living entity recognition first sensor evaluation arrangement comprises at least one of a carbon dioxide, oxygen, sound, infrared and vibration sensor.

4. Apparatus according to claim 1, wherein at least one said sensor evaluation arrangement assigns the signals received from the at least one individual sensors to a signal-time spectrum and relates it to stored comparison spectra and, in the process, checks the spectra for similarity and outputs the signal when a similarity threshold value is exceeded.

5. Apparatus according to claim 1, wherein a plurality of signal-time spectra recorded by different types of individual sensors, in particular simultaneously, are referred to stored comparison spectra.

6. Apparatus according to claim 1, wherein the living environment monitoring second sensor evaluation arrangement comprises a plurality of sensors.

7. Apparatus according to claim 1, wherein the living environment monitoring second sensor evaluation arrangement comprises at least one of a carbon dioxide, oxygen, sound and temperature sensor.

8. Apparatus according to claim 1, wherein the living environment monitoring second sensor evaluation arrangement relates a plurality of signals output by the individual sensors to one another and outputs a second signal if these relationships exceed or fall below a limit value.

9. Apparatus according to claim 8, wherein the relationship is a logic combination of two individual signals.

10. Apparatus according to claim 1, wherein the sensors interact simultaneously with the two sensor evaluation arrangements.

11. Apparatus according to claim 1, wherein the at least one actuator also provides actuation of a window raising/lowering mechanism.

12. Apparatus according to claim 1, wherein in event of activation of the at least one actuator, hazard warning lights and/or a horn are/is activated.

13. Apparatus according to claim 1, wherein in event of activation of the at least one actuator, the flap or door is brought to a slightly open position or a fully open position.

14. Apparatus according to further comprising an anti-theft alarm system which is connected to the control system and prevents the activation of the actuators when triggered.

15. Apparatus according to claim 1, wherein the door or flap, in the event of activation of the at least one actuator, is only brought to an internally unlockable operating state, so that opening is possible from the inside.

16. Method for monitoring closed off interior space of a motor vehicle, with respect to living entities enclosed therein and environmental conditions within the interior space, comprising the steps of a first sensor evaluation arrangement interacting with at least one sensor outputting a first signal to a control circuit if there are living entities in the interior space, and a second sensor evaluation arrangement interacting with at least one sensor outputting a second signal to the control circuit upon detecting a predetermined change of environmental conditions within the living environment, at least one actuator which is connected to the control circuit and acts on a motor-actuable closure of the interior space being activated by the control circuit for the purpose of opening, unlocking or rendering unlockable the interior space when both the first and the second signals have been output.

17. Method according to claim 2, wherein the living entity recognition first sensor evaluation arrangement comprises a plurality of sensors sensing conditions.

18. Method according to claim 2, wherein the living entity recognition first sensor evaluation arrangement comprises at least one of a carbon dioxide, oxygen, sound, infrared and vibration sensor sensing corresponding conditions.

19. Method according to claim 2, wherein at least one said sensor evaluation arrangement assigns the signals received from the at least one individual sensors to a signal-time spectrum and relates it to stored comparison spectra and, in the process, checks the spectra for similarity and outputs the signal when a similarity threshold value is exceeded.

20. Method according to claim 2, wherein a plurality of signal-time spectra recorded by different types of individual sensors, in particular simultaneously, are referred to stored comparison spectra.

21. Method according to claim 2, wherein the living environment monitoring second sensor evaluation arrangement comprises a plurality of sensors sensing conditions.

22. Method according to claim 2, wherein the living environment monitoring second sensor evaluation arrangement comprises at least one of a carbon dioxide, oxygen, sound and temperature sensor sensing corresponding conditions.

23. Method according to claim 2, wherein the living environment monitoring second sensor evaluation arrangement relates a plurality of signals output by the individual sensors to one another and outputs a second signal if these relationships exceed or fall below a limit value.

24. Method according to claim 23, wherein the relationship is a logic combination of two individual signals.

25. Method according to claim 2, wherein the sensors interact simultaneously with the two sensor evaluation arrangements.

26. Method according to claim 2, wherein the at least one actuator also provides actuation of a window raising/lowering mechanism.

27. Method according to claim 2, wherein in event of activation of the at least one actuator, hazard warning lights and/or a horn are/is activated.

28. Method according to claim 2, wherein in event of activation of the at least one actuator, the flap or door is brought to a slightly open position or a fully open position.

29. Method according to claim 2, wherein an anti-theft alarm system which is connected to the control system prevents the activation of the actuators when triggered.

30. Method according to claim 2, wherein the door or flap, in the event of activation of the at least one actuator, is only brought to an internally unlockable operating state, so that opening is possible from the inside.

* * * * *